(12) United States Patent
Kobayashi

(10) Patent No.: US 6,686,908 B1
(45) Date of Patent: Feb. 3, 2004

(54) TABLET TYPE KEY INPUT DEVICE AND INFORMATION TERMINAL DEVICE

(75) Inventor: Hideo Kobayashi, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 116 days.

(21) Appl. No.: 09/707,999

(22) Filed: Nov. 8, 2000

(30) Foreign Application Priority Data

Apr. 25, 2000 (JP) .......................................... 2000-123764

(51) Int. Cl.[7] ................................................ G09G 5/00
(52) U.S. Cl. ........................ 345/173; 345/172; 345/168; 341/22
(58) Field of Search ................................ 345/173, 156, 345/158, 168, 169, 171, 172, 174, 175, 176, 177, 179; 341/22, 23; 178/18.01

(56) References Cited

U.S. PATENT DOCUMENTS

| | | | | |
|---|---|---|---|---|
| 4,359,222 A | * | 11/1982 | Smith et al. ............... | 463/31 |
| 4,890,832 A | * | 1/1990 | Komaki .................... | 463/44 |
| 5,914,707 A | * | 6/1999 | Kono ....................... | 345/173 |
| 5,987,612 A | * | 11/1999 | Takagawa et al. ........ | 713/201 |

FOREIGN PATENT DOCUMENTS

| | | |
|---|---|---|
| JP | 58-056083 | 4/1983 |
| JP | 59-123986 | 7/1984 |
| JP | 60-196833 | 10/1985 |
| JP | 60-246469 | 12/1985 |
| JP | 62-107360 | 5/1987 |
| JP | 62-173520 | 7/1987 |
| JP | 1-175324 | 12/1989 |
| JP | 04-088547 | 3/1992 |
| JP | 04-349561 | 12/1992 |
| JP | 5-189624 | 7/1993 |
| JP | 2000-020439 | 1/2000 |

OTHER PUBLICATIONS

Electronic translation of JP05–189624 from Japanese Patent Office web site (http://www1.ipdl.jpo.go.jp).*

Japanese Office Action dated Sep. 5, 2002.

* cited by examiner

*Primary Examiner*—Dennis-Doon Chow
(74) *Attorney, Agent, or Firm*—Crowell & Moring LLP

(57) ABSTRACT

A key input device 1 is provided with a transparent tablet 1b, and when an IC card 2 is inserted from an insertion inlet 1c and set in the key input device 1, characters or numerals 20 printed on the surface of a card 2 are represented in the tablet 1b as a key operational portion. The IC card 2 stores therein a program for assigning the keys represented in the tablet 1b to the predetermined functions. When the key portion of the tablet 1b is pushed, a code signal corresponding to its key is generated.

6 Claims, 13 Drawing Sheets

FIG. 5A

| IDENTIFICATION CODE | ~ 22 |

FIG. 5B

| IDENTIFICATION CODE 001 | PROGRAM (1) |
|---|---|
| IDENTIFICATION CODE 002 | PROGRAM (2) |
| IDENTIFICATION CODE 003 | PROGRAM (3) |
| ⋮ | ⋮ |

7

FIG. 9
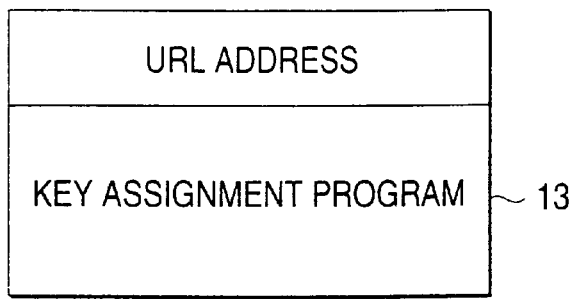
FIG. 10A
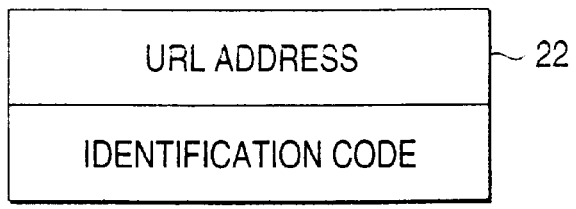
FIG. 10B
| IDENTIFICATION CODE 001 | PROGRAM (1) |
|---|---|
| IDENTIFICATION CODE 002 | PROGRAM (2) |
| IDENTIFICATION CODE 003 | PROGRAM (3) |
| ⋮ | ⋮ |

TABLET TYPE KEY INPUT DEVICE AND INFORMATION TERMINAL DEVICE

BACKGROUND OF THE INVENTION

The present invention relates to a key input device and an information terminal device which perform key assignment by use of information memory medium such as an IC card and the like, and particularly to a device provided with a tablet.

As a key input device provided with a tablet, various devices have been already known. In the conventional devices, key layout of a key input portion of the tablet was determined according to each device, and function of each key was fixed. Accordingly, the device having the different key layout according to the various uses was required.

On the other hand, an electronic equipment which can add and change function by mounting a memory card therein has been disclosed in JP-A-5-189624. Herein, a mark which is different in position according to a kind of a card is formed on the surface of the memory card, and when the memory card is inserted into a body, a portion of the mark seen through the transparent tablet is pushed thereby to identify the kind of the card. Then, a program or data corresponding to the card is read out from a ROM and the program is executed.

In the above equipment, though addition and change of the function can be performed by executing the program corresponding to each card, change of key layout and assignment of key are not referred to, so that this equipment cannot correspond to the different key layout according to the use.

SUMMARY OF THE INVENTION

Therefore, a main object of the invention is to use the key input device privately for the card mounted therein and to correspond to various key layouts by one device.

Another object of the invention is to provide the key input device which goes off with small memory capacity of the memory located on the device side.

Another object of the invention is to provide the key input device which goes off with small memory capacity of the memory located on the card side.

Another object of the invention is to provide the information terminal device which can be connected to the Internet and utilized in the various uses by combining the above key input device, the transmit-receive portion and the display portion.

Another object of the invention is to easily display the home page of the Internet corresponding to each card in the above information terminal device.

Another object of the invention is to quickly and readily perform the operation such as selection of items in the displayed home page.

Further, another object of the invention is to select the key layout of the standard key board and other key layouts in the above information terminal device to enlarge the utilization range of the terminal device.

A tablet type key input device according to the invention comprises an insertion inlet into which information memory medium having a plurality of marks displayed on its surface is inserted; a transparent tablet in which the marks of the information memory medium inserted into the insertion inlet are represented as a key operational portion; a reading portion for reading information recorded in the information memory medium; and a control portion for assigning the respective marks represented on the tablet to specific keys according to the information read by the reading portion.

The information memory medium is, for example, an IC card, on the surface of which marks such characters, signs, figures and the like are displayed by printing or the like. When this IC card is inserted into the key input device, the marks are represented through the transparent tablet. The marks represented in the tablet become the key operational portion as it is. By pushing each key portion in the tablet, the corresponding key is operated. In this case, the key operational portion is different according to the mounted IC card, and the control portion assigns the key function correspondingly to the respective cards. Therefore, the key input device is privately used for each card, and it is possible to realize the key input device capable of corresponding to the various uses with one device by changing the card.

The program for assigning the keys is stored in, for example, a memory of the IC card, and the assignment of the keys is performed in each card in accordance with this program.

Since the IC card stores therein the memory of which capacity is much larger than memory capacity of a magnetic card, it can store the program for assigning the keys in this memory, whereby the memory of the large capacity is not required on the key input device side.

On the other hand, in case that there is liberal memory capacity on the device side, the above program can be stored in the memory on the device side in such a manner that it corresponds to each card. In this case, a specific identification code is stored in the card, this identification code is read on the device side, and a program corresponding to the identification code is read out from the memory to perform the assignment of the key operational portions. Hereby, it is not necessary to store the program in the card. Therefore, the magnetic card having the small memory capacity can be used as the information memory medium.

Next, a tablet type information terminal device according to the invention comprises an insertion inlet into which information memory medium having a plurality of marks displayed on its surface is inserted; a transparent tablet in which the marks of the information memory medium inserted into the insertion inlet are represented as a key operational portion; a reading portion for reading information recorded in the information memory medium; a control portion for assigning the respective marks represented on the tablet to specific keys according to the information read by the reading portion; a transmit-receive portion for transmitting a signal corresponding to the key according to the operation of the assigned key and receiving the predetermined information from an external portion; and a display portion for displaying the received information.

Since this information terminal device is provided with transmit-receive portion and the display portion, it can be connected to Internet and it is possible to read a home page. In the displayed home page, the various operations can be performed by use of the key operational portion of the tablet. For example, in a home page of a securities company, reference in stocks, dealings in stocks, and the like can be performed.

In the above case, a specific URL address is stored in each card. After this URL address is read, the device is connected to Internet, whereby a home page corresponding to the card can be displayed easily. Further, it is preferable that layout of the keys represented in the tablet is the same as that of the keys displayed on the home page. Hereby, in case that the user desires to select a key represented on the home page, he only operates the same key as its key on the tablet of the information terminal device. Therefore, selection of items on the home page can be performed very easily and without an error. Further, since it is not necessary to perform the selection by moving a cursor on a screen, the operation can be performed quickly.

In case that a card on which key layout of a standard key board is displayed is used and the keys represented in the tablet are assigned to keys of the standard key board, the information terminal device can be used as a usual personal computer, so that the utilization range of the device is enlarged more.

BRIEF DESCRIPTION OF DRAWINGS

FIGS. 5A and 5B are diagrams of another example of the table diagram showing memory contents of an IC card.

FIG. 9 is a table diagram showing memory content of an IC card.

FIGS. 10A and 10B are diagrams of another example of the table diagram showing memory contents of an IC card.

DETAILED DESCRIPTION OF THE PREFERRED EMBODIMENTS

Figure 1A:
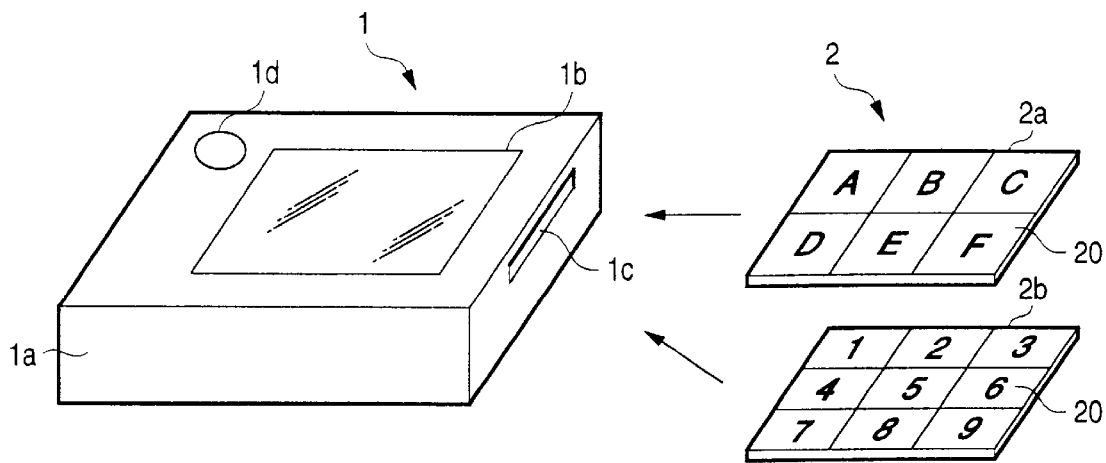
FIGS. 1A to 1C are diagrams showing the schematic constitution of a tablet type key input device according to the invention.

The mode for carrying out the invention will be described below with reference to drawings. FIG. 1 is a diagram showing the schematic constitution of a tablet type key input device according to the invention. In FIG. 1A, reference numeral $1a$ is a body of a key input device 1, $1b$ is a transparent tablet provided on the upper surface of the body $1a$, $1c$ is an insertion inlet provided on a side surface of the body $1a$, into which an IC card 2 is inserted, and $1d$ is a power switch provided on the upper surface of the body $1a$.

The body $1a$ is composed of a case of the box type, and it includes each block described later therein. The tablet $1b$ is composed of a known transparent touch panel and provided with a detecting portion composed of, for example, a resistance film (not shown). When this detecting portion is pushed, then the resistance value of the pushed portion changes, and a detection signal is output. The insertion inlet $1c$ is formed as a slit which is fit to the size of the IC card 2. The power switch $1d$ is composed of, for example, a push button switch.

On the surface of the IC card 2, plural marks 20 representing a key operational portion are printed. On an IC card $2a$, marks 20 comprising characters A to F are printed, and on an IC card $2b$, marks 20 comprising numerals 1 to 9 are printed. Figures or signs in addition to such the characters and numerals may be used as the mark 20.

Figure 1B:
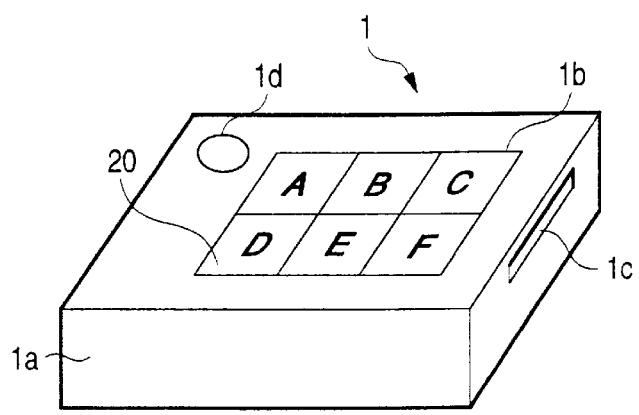

FIG. 1B shows a state in which the IC card $2a$ of FIG. 1A is inserted into the insertion inlet $1c$ of the body $1a$ and set in the key input device 1. In this state, the characters 20 printed on the surface of the IC card can be recognized visually through the transparent tablet $1b$. Each of the characters A to F corresponds to one key, and the key operational portion comprising six keys is formed.

Figure 1C:
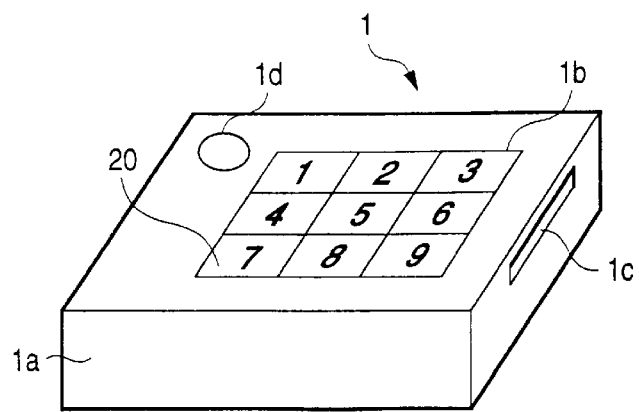

FIG. 1C shows a state in which the IC card $2b$ of FIG. 1A is inserted into the insertion inlet $1c$ of the body $1a$ and set in the key input device 1. Also, in this state, the numerals 20 printed on the surface of the IC card can be recognized visually through the transparent tablet $1b$. Each of the numerals 1 to 9 corresponds to one key, and the key operational portion comprising nine keys is formed.

By mounting the IC card 2 in the key input device 1, the marks 20 printed on the surface of the card are represented in the tablet $1b$ as the key operational portion, as described above. By pushing the predetermined mark 20 of this key operational portion from the top of the tablet $1b$, acode signal corresponding to the pushed key is generated. For example, when a character [D] of the tablet $1b$ is pushed in FIG. 1B, a code signal corresponding to the [D] key is generated. When a numeral [3] of the tablet $1b$ is pushed in FIG. 1C, a code signal corresponding to the [3] key is generated. In the key input device 1, the signals corresponding to the marks 20 printed on the IC card 2 are generated in this manner. Assignment of the respective keys in the key operational portion represented in the tablet $1b$ is performed in accordance with a program recorded in the IC card 2. The details of the assignment will be described later.

Figure 2A:
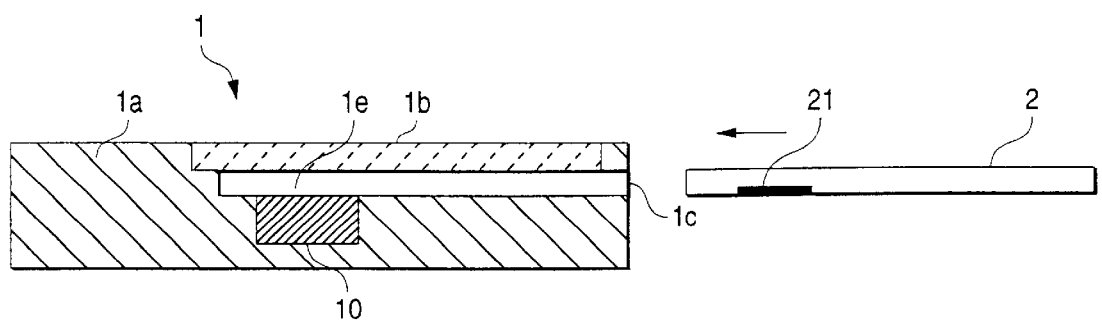
FIGS. 2A and 2B are sectional views showing the inner structure of the key input device.
Figure 2B:
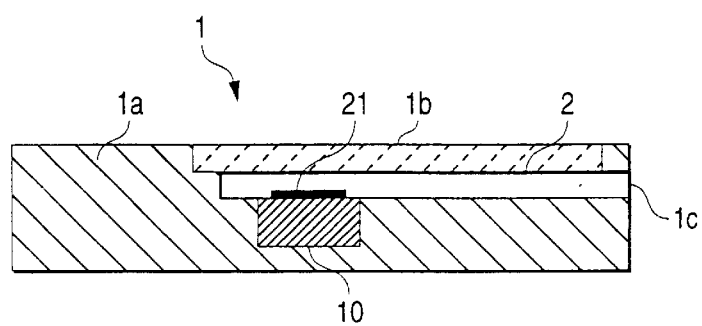

FIG. 2 is a sectional view showing the inner structure of the key input device 1, in which FIG. 2A shows a state before the IC card 2 is mounted in the device and FIG. 2B shows a state in which the IC card has been mounted in the device. Reference numeral $1a$ is a body,$1b$ is a transparent tablet, and $1c$ is an insertion inlet of the card, which have been explained in FIG. 1. Reference numeral $1e$ is a storage portion of the card, which is formed continuously with the insertion inlet $1c$. The IC card 2 inserted in the device from the direction of an arrow in FIG. 2A is stored in this storage portion $1e$ and set just below the tablet $1b$ as shown in FIG. 2B. In this state, as shown in FIGS. 1B and 1C, the marks 20 printed on the surface of the IC card 2 are visually recognized through the tablet $1b$. Reference numeral 10 is an IC card reading portion, which has a known structure in which the IC card reading portion is provided with a contact terminal (not shown) coming into contact with a terminal (not shown) of a chip 21 contained in the IC card 2.

Figure 3:
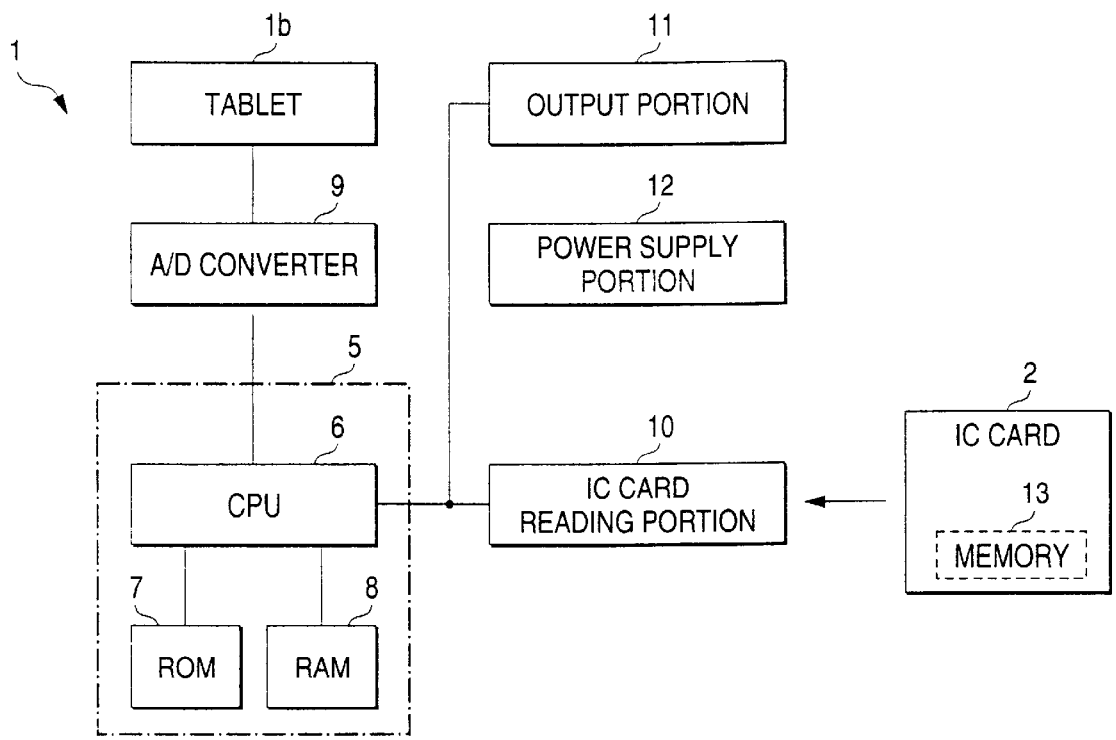
FIG. 3 is a block diagram showing the electric constitution of the key input device.

FIG. 3 is a block diagram showing the electric constitution of the key input device 1, in which the same portions as those in FIGS. 1 and 2 are represented with the same reference numerals and signs. In FIG. 3, reference numeral 5 is a microcomputer including a CPU 6 which is a control portion, and a ROM 7 and a RAM 8 which are memory sections, and the microcomputer performs a control operation of the whole of the device. Reference numeral 9 is an A/D converter, which converts a voltage detected by change of the resistance value due to pushing of the tablet 1b into a digital value, and sends the converted value to the CPU 6. To the CPU 6, the aforesaid IC card reading portion 10 is connected and an output portion 11 for outputting the signal corresponding to the key operated on the tablet 1b is also connected. Reference numeral 12 is a power supply portion for supplying a direct current to each block, and 13 is a memory constituting the chip 21 (refer to FIG. 2) of the IC card 2.

Figure 4:
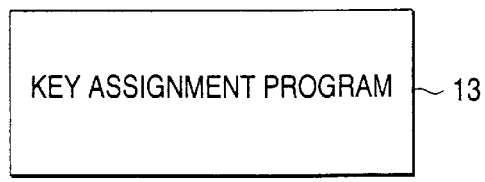
FIG. 4 is a table diagram showing memory contents of an IC card.

A key assignment program for determining which function is assigned to each key represented in the tablet 1b is stored in the memory 13 of the IC card 2, as shown in FIG. 4. This program, when the IC card 2 is mounted in the key input device 1, is read by the IC card reading portion 10 and sent to the CPU 6. The CPU 6 stores the received programs in the RAM 8 and performs the key assignment in relation to the key input from the table 1b in accordance with this program. Hereby, since the program is recorded in the IC card 2, even small memory capacity of the memory on the key input device 1 side is enough.

In the above example, though the IC card is used as the information memory medium, a magnetic card or an optical card can be substituted for this IC card. However, in case of the magnetic card, the amount of information which can be stored in a magnetic stripe is limited. Therefore, it is actually impossible to record the program for the key assignment in the magnetic card. Accordingly, in case that the memory capacity of the card is small as described above, it is thought that an identification code is stored in the card and a program corresponding to the identification code is provided on the key input device side. Needless to say, even the IC card can adopt this system.

FIG. 5 shows an example of this case. As shown in FIG. 5A, an identification code corresponding to the card is stored in a memory 22 (including the magnetic stripe) on the card side. On the other hand, in the ROM 7 (or RAM 8) of the key input device 1, as shown in FIG. 5B, the key assignment programs corresponding to the respective identification codes are stored. When the IC card 2 is mounted in the key input device 1, the identification code is read by the IC card reading portion 10 and sent to the CPU 6. The CPU reads out a program corresponding to the received identification code from the ROM 7, and performs the key assignment in accordance with the program. Hereby, since the program is recorded in the key input device 1, even the small memory capacity of the card is enough, so that it is possible to realize recording of the program for key assignment with use of the magnetic card at a low cost.

The key input device 1 as described above can be widely utilized as the key input device in, for example, a remote control device, a portable telephone, a game machine, an electronic dictionary, an electronic pocket notebook, and the like. For example, in case of the portable telephone, by mounting a card on which key layout of an electronic portable calculator is displayed, it is possible to use the telephone as the electronic portable calculator in accordance with the program stored in the card.

Figure 6A:
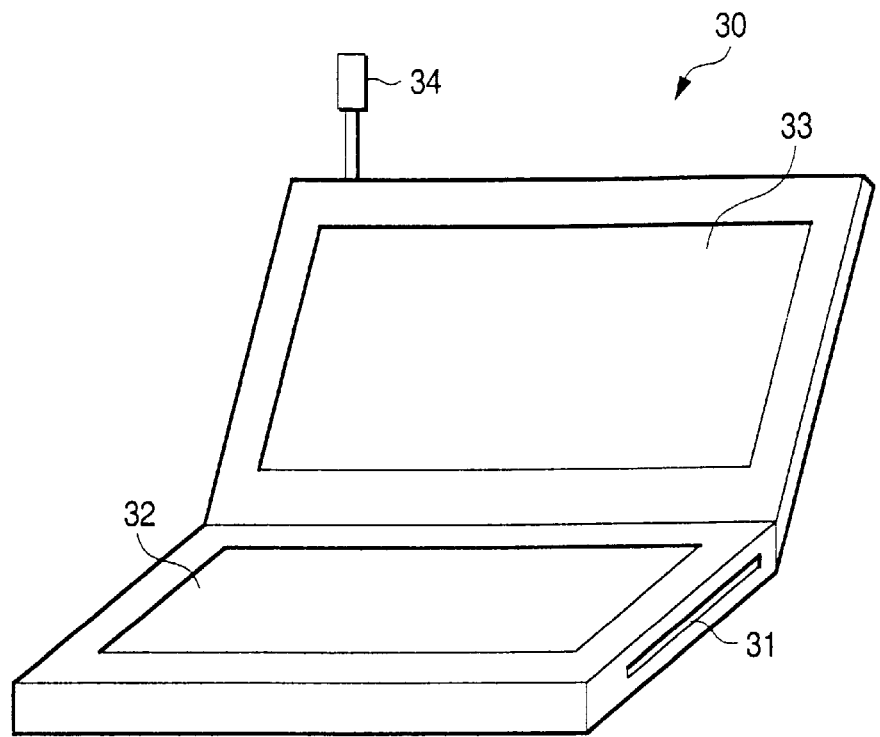
FIGS. 6A and 6B are diagrams showing the schematic constitution of a tablet type information terminal device according to the invention.
Figure 6B:
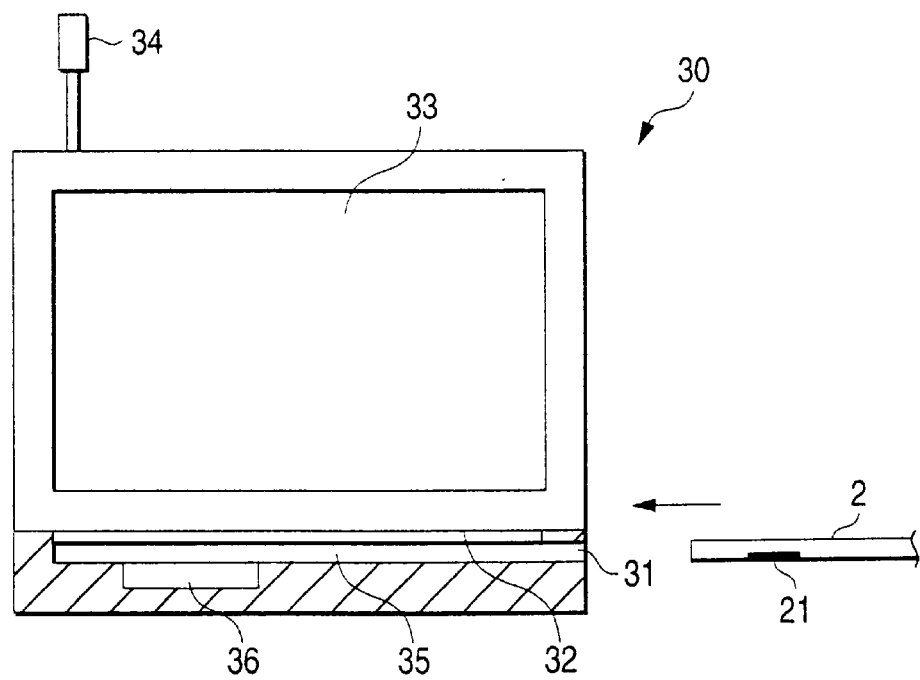

FIG. 6 is a diagram showing the schematic constitution of a tablet type information terminal device according to the invention, FIG. 6A is a perspective view, and FIG. 6B is a partially sectional front view. In the figures, reference numeral 30 is an information terminal device, 31 is an insertion inlet of an IC card 2, 32 is a transparent tablet, 33 is a display portion comprising a liquid crystal display and the like, 34 is a transmit-receive antenna, 35 is a card storage portion formed continuously with the insertion inlet 31, and 36 is an IC card reading portion.

Figure 7:
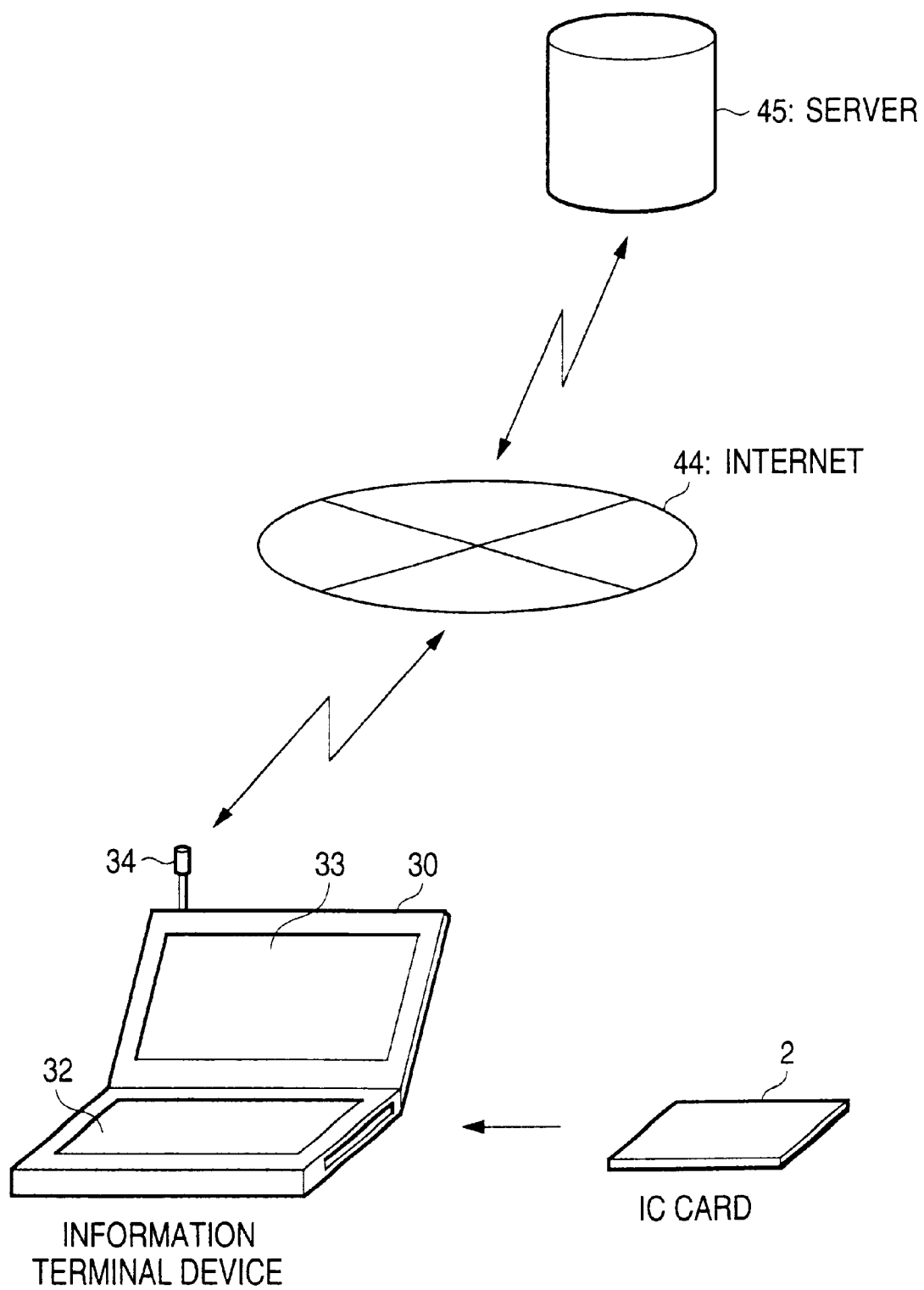
FIG. 7 is a diagram showing a system in which the information terminal device is connected to Internet.

Such the information terminal device 30 can be connected to, for example, Internet and utilized. FIG. 7 shows a system in which the information terminal device 30 is connected to Internet 44 through the transmit-receive antenna 34 to acquire information stored in a server 45, and the information is displayed on the display portion 33. In this case, as described later, a home page corresponding to the mounted IC card 2 can be displayed on the display portion 33.

Figure 8:
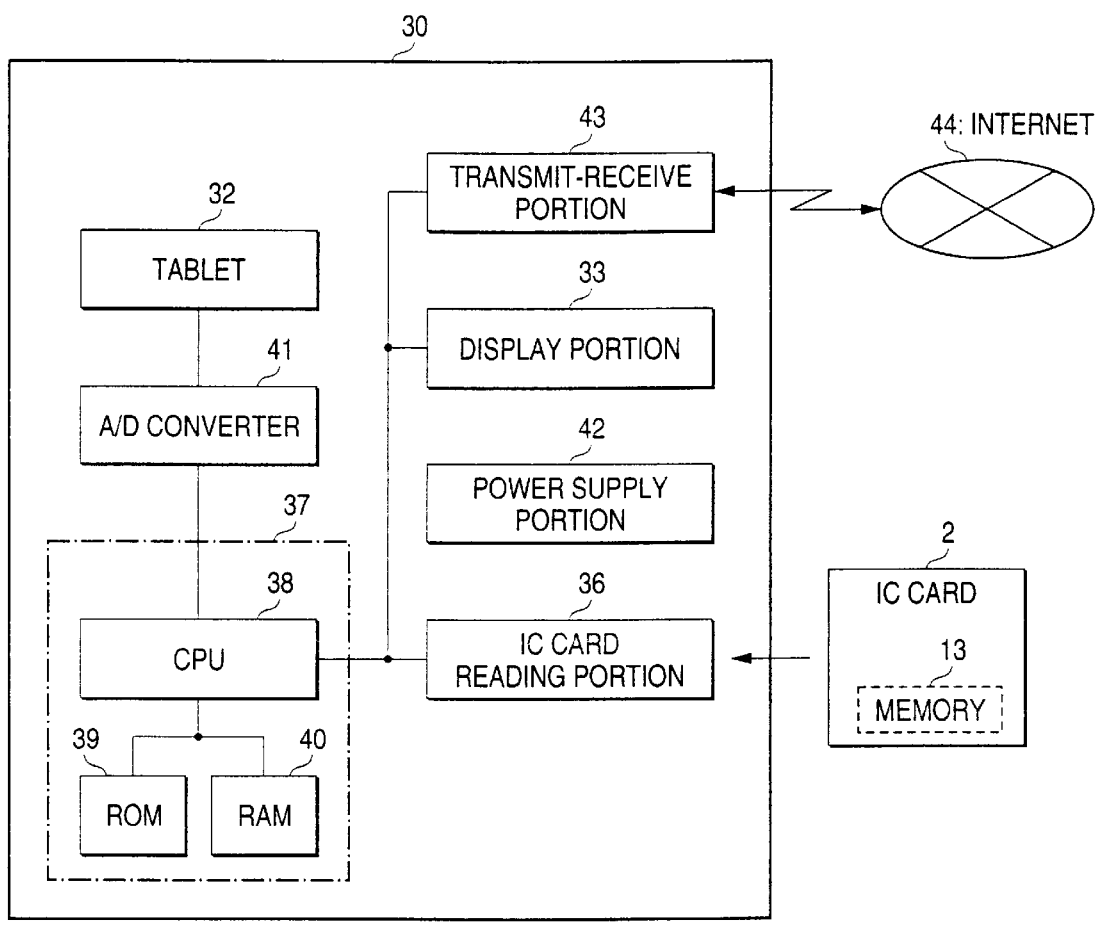
FIG. 8 is a block diagram showing the electric constitution of the information terminal device.

FIG. 8 is a block diagram showing the electric constitution of the information terminal device 30. In FIG. 8, reference numeral 37 is a microcomputer including a CPU 38 which is a control portion, and a ROM 39 and a RAM 40 which are memory sections, and the microcomputer performs a control operation of the whole of the device. Reference numeral 41 is an A/D converter, which converts a voltage detected by change of the resistance value due to pushing of the tablet 32 into a digital value, and sends the converted value to the CPU 38. To the CPU 38, the aforesaid display portion 33 and IC card reading portion 36 are connected, and a transmit-receive portion 43 including a transmit-receive circuit and a transmit-receive antenna 34 is also connected thereto. The transmit-receive portion 43 transmits and receives data between the Internet 44 and the portion 43. Reference numeral 42 is a power supply portion for supplying a direct current to each block.

FIG. 9 is a table diagram showing memory contents of a memory 13 of the IC card 2. One dedicated IC card 2 is provided correspondingly to the specific home page, for example, in such a manner that there are provided one dedicated card used for reading a home page of a department store A, one dedicated card used for reading a home page of a shop B, and one dedicated card used for reading a home page of a company C. In the memory 13 of each IC card 2, as shown in FIG. 9, an URL address of the home page corresponding to its card is recorded with a code. Further, in case that item selection is performed on the home page by operating the key operational portion of the tablet 32, a key assignment program for determining which function is assigned to each key is stored in the memory 13.

These data, when the IC card 2 is mounted in the information terminal device 30, are read by the IC card reading portion 36 and sent to the CPU 38. The CPU 38 stores the received data in the RAM 40 and performs key assignment in relation to the key input from the tablet 32 in accordance with the key assignment program. Further, the CPU 38 reads out the URL address from the RAM 40 and sends this URL address to the Internet 44 through the transmit-receive portion 43.

FIG. 10 shows an example in which the key assignment program is provided on the information terminal device 30 side. As shown in FIG. 10A, a memory 22 (including a magnetic stripe) on the card side stores an URL address of a home page corresponding to the card and an identification code therein. On the other, the ROM 39 (or RAM 40) of the information terminal device 30, as shown in FIG. 10B, stores therein key assignment programs corresponding to the respective identification codes. Here, the card may store only the identification code and the ROM 39 may record the URL address corresponding to the identification codes together with the programs.

When the IC card 2 is mounted in the information terminal device 30, the URL address and the identification code are read by the IC card reading portion 36 and sent to the CPU 38. The CPU 38 reads out a program corresponding to the received identification code from the ROM 39, and performs key assignment in accordance with the program. Further, the CPU 38 sends the URL address through the transmit-receive portion 43 to the Internet 44.

Figure 11:
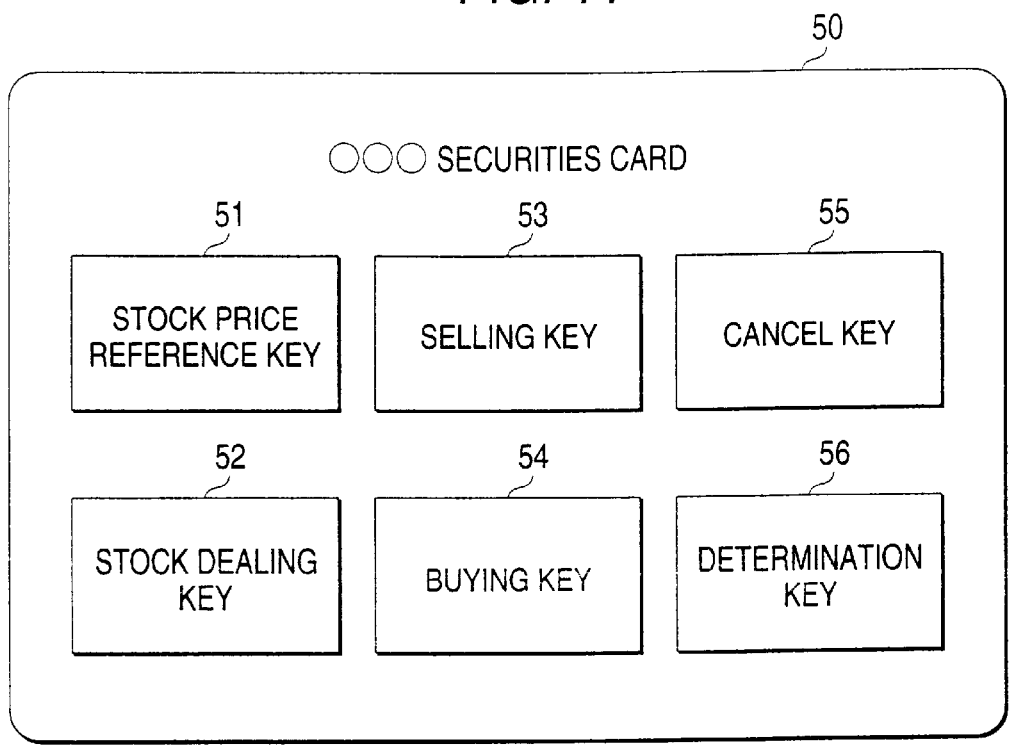
FIG. 11 is a diagram showing a securities card.

Next, the concrete example in case that the home page is read by use of the above information terminal device 30 will be described. Here, a case in which a securities card 50 shown in FIG. 11 is set in the information terminal device 30 to read a home page of a securities company will be described as an example. The securities card 50 is composed of an IC card, and an inner memory thereof stores therein an URL address and a key assignment program as shown in FIG. 9. The URL address is address for opening a home page of the securities company corresponding to this securities card 50, and the key assignment program is a program for assigning keys for performing operations such as stock price reference, stock dealing and the like on this home page. Further, on the surface of the securities card 50, a stock price reference key 51, a stock dealing key 52, a selling key 53, a buying key 54, a cancel key 55 and a determination key 56 are respectively printed.

Figure 12:
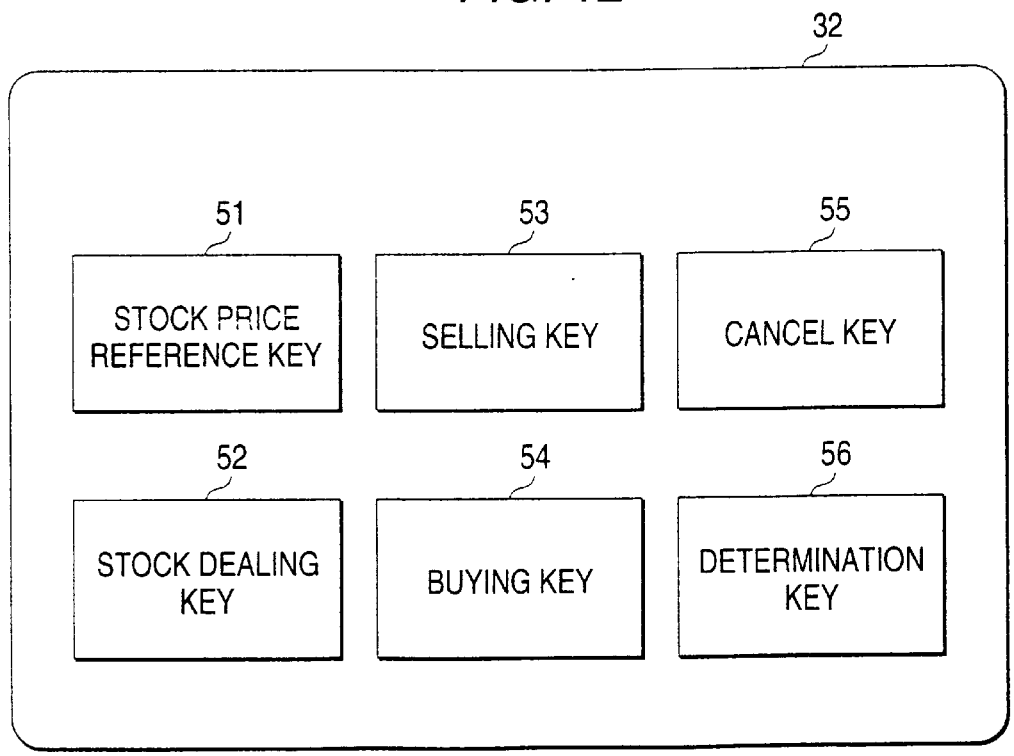
FIG. 12 is a plan view of a tablet in which the securities card is set.

FIG. 12 is a plan view of the tablet 32 in which the securities card 50 is set. In the tablet 32 of the information terminal device 30, the above six keys 51 to 56 printed on the surface of the securities card 50 are represented as a key operation portion.

Figure 13:
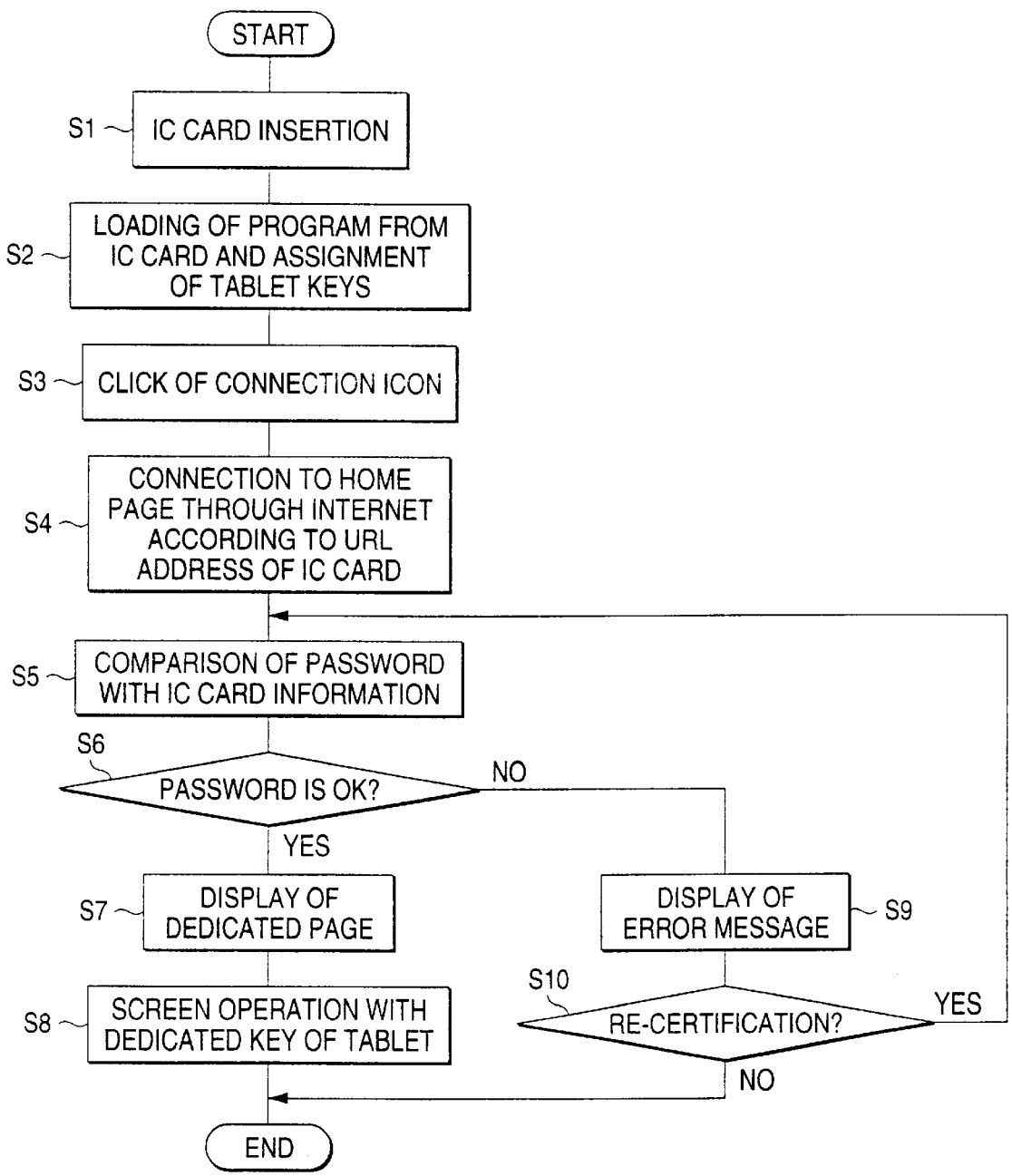
FIG. 13 is a flowchart showing a procedure for reading a home page.

FIG. 13 is a flowchart in case that the home page is read by use of the above securities card 50. A procedure will be described below in accordance with this flowchart. First, the securities card 50 is inserted into the insertion inlet 31 of the information terminal device 30 (step S1). When the card is inserted, the key assignment program stored in the memory of the securities card 50 is read out by the IC card reading portion 36 and loaded to the RAM 40. The CPU 38 assigns function to each of the keys 51 to 56 in accordance with this program (step S2).

Next, when a connection icon displayed on the display portion 33 is clicked (step S3), then the URL address read out from the memory of the securities card 50 by the IC card reading section 36 is transmitted from the transmit-receive portion 43 to the Internet 44, so that connection to a home page corresponding to the URL address is performed (step S4). In result, the home page of the securities company corresponding to the securities card 50 is displayed on the display portion 33 of the information terminal device 30.

Subsequently, a password is input in the displayed home page and compared with security information recorded in the card to perform certification (steps S5, S6). In case that the password is wrong (No in step S6), an error message is displayed (step S9), and whether certification is again performed or not is selected (step S10). In case that certification is again performed (YES in step S10), the procedure is returned to the step S5 and a password is again input. In case that certification is not performed again (NO in step 10), the procedure ends.

Figures 14A, 14B:
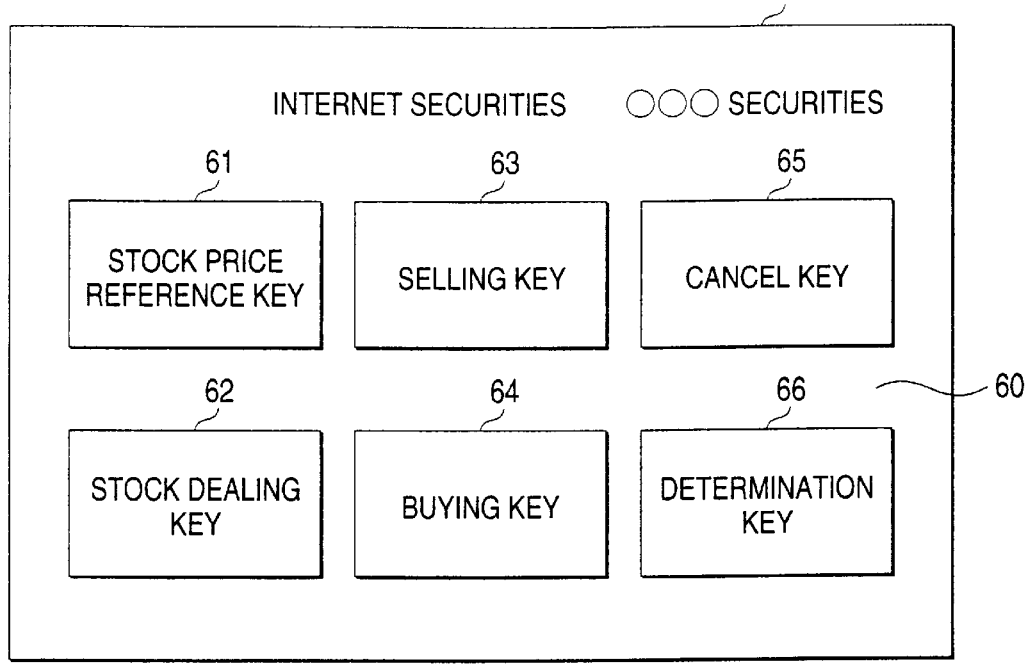
FIGS. 14A and 14B are diagrams showing an example of a screen on which a home page is displayed.

On the other hand, in case that the input password is right (YES in step S6), a dedicated page 60, for example, as shown in FIG. 14A is displayed on a screen of the display portion 33 (step S7). On this screen, six keys of a stock price reference key 61, a stock dealing key 62, a selling key 63, a buying key 64, a cancel key 65 and a determination key 66 are displayed. Key layout on this screen is, as clear from comparison with the key layout in FIG. 12, displayed in the same manner as the key layout represented in the tablet 32 of the information terminal device 30. The user selects a menu of his desire on this dedicated page 60 by use of the key of the tablet 32 and performs a predetermined operation (step S8).

Now, when the user desires to make reference to a stock price, he pushes a portion of the stock price reference key 51 in the tablet 32 of FIG. 12. A function serving as a key for making reference to a stock price is assigned to this stock price reference key 51 by the key assignment program, and a code signal corresponding to this key is generated by pushing the stock price reference key 51 and transmitted from the transmit-receive portion 43. In result, a stock price reference page 67 as shown in FIG. 14B is displayed on a screen of the display portion 33. On this screen, closing price, rate to previous day, and sales amount for each name are displayed on this screen in a list manner, and the user can make reference to the stock price easily by seeing this page 67.

Similarly, when the user operates the stock dealing key 52 in the tablet 32, a code signal corresponding to this key is generated and transmitted from the transmit-receive portion 43, and a stock dealing page (not shown) is displayed on a screen of the display portion 33. The user performs the stock dealing on this page with use of the keys 53 to 56 of the tablet 32.

As described above, the keys 61 to 66 on the screen of the display portion 33 are displayed, as shown in FIG. 14(a), with the same layout as the keys 51 to 56 in the tablet 32. By pushing the keys 51 to 56 corresponding to the respective keys 61 to 66, the processing corresponding to the pushed key is performed. In this case, since the key layout of the display portion 33 corresponds to that of the tablet 32 entirely, the operation in key selection is performed very easily. Further, since it is not necessary to move a cursor on the screen to perform selection, the operation can be performed quickly and reliably.

In the above example, the key assignment program is stored in the memory of the securities card 50. However, as described in FIG. 10, this program may be stored in the ROM 39 of the information terminal device 30.

In the above explanation, a case in which one URL address is recorded in one card has been described, however, a plurality of the URL address may be recorded in one card. In this case, it is preferable that the device is so constructed that the different URL address according to the card inserting direction or obverse and reverse of the card is read.

Figure 15:
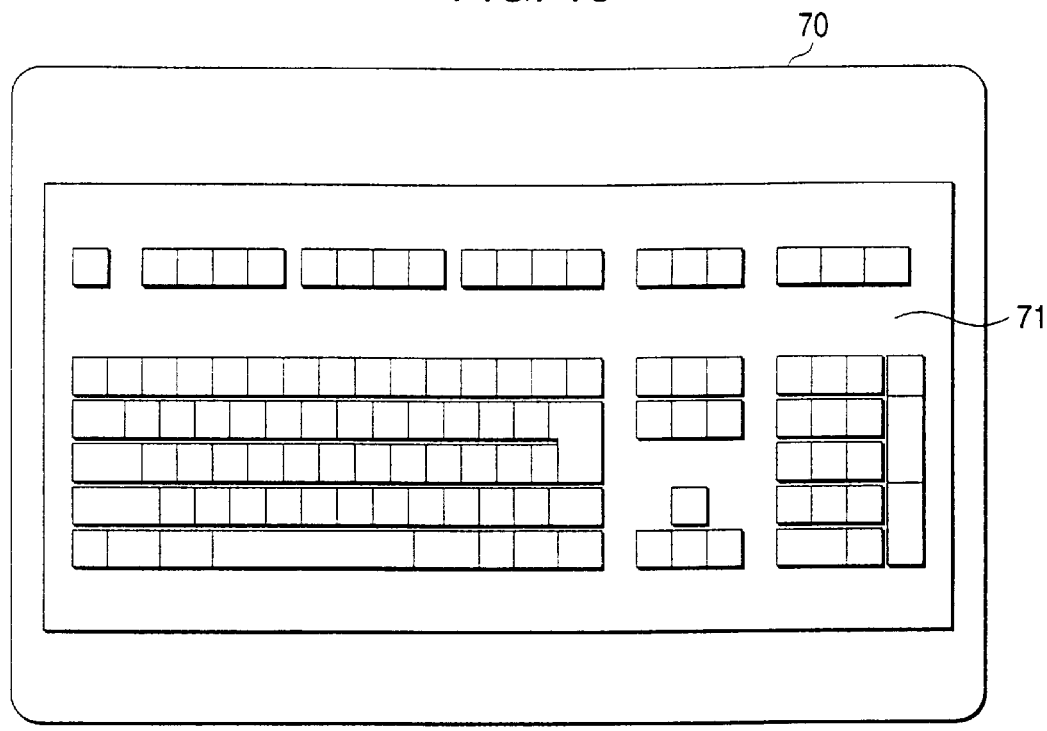
FIG. 15 is a diagram showing a keyboard card.

FIG. 15 shows another example of the IC card. Here, the IC card is formed as a keyboard card 70 on which key layout 71 of a standard keyboard is printed. Further, a memory in the card stores therein a program for assigning keys to keys of the standard keyboard. When this keyboard card 70 is set in the key input device 1 or the information terminal device 30, the key operational portion in the tablet 1b or 32 becomes the standard keyboard, so that the key input device or the information terminal device can be used widely. For example, when the keyboard card 70 is mounted in the information terminal device 30, the information terminal device 30 can be used as a personal computer. Further, a card used for a specific purpose such as the aforesaid securities card 50 is mounted in the information terminal device 30, the information terminal device 30 serves as a dedicated terminal specific to its purpose. By providing the various cards, the information terminal device 30 is utilized in a wide range.

Figure 16:
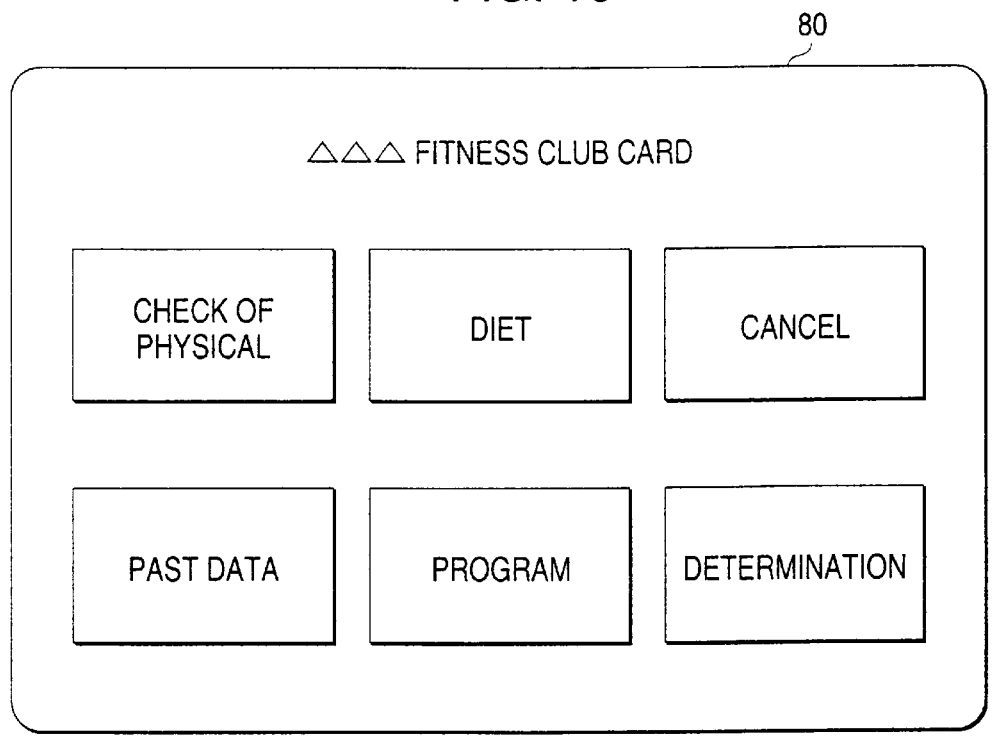
FIG. 16 is a diagram showing a fitness club card.
Figure 17:
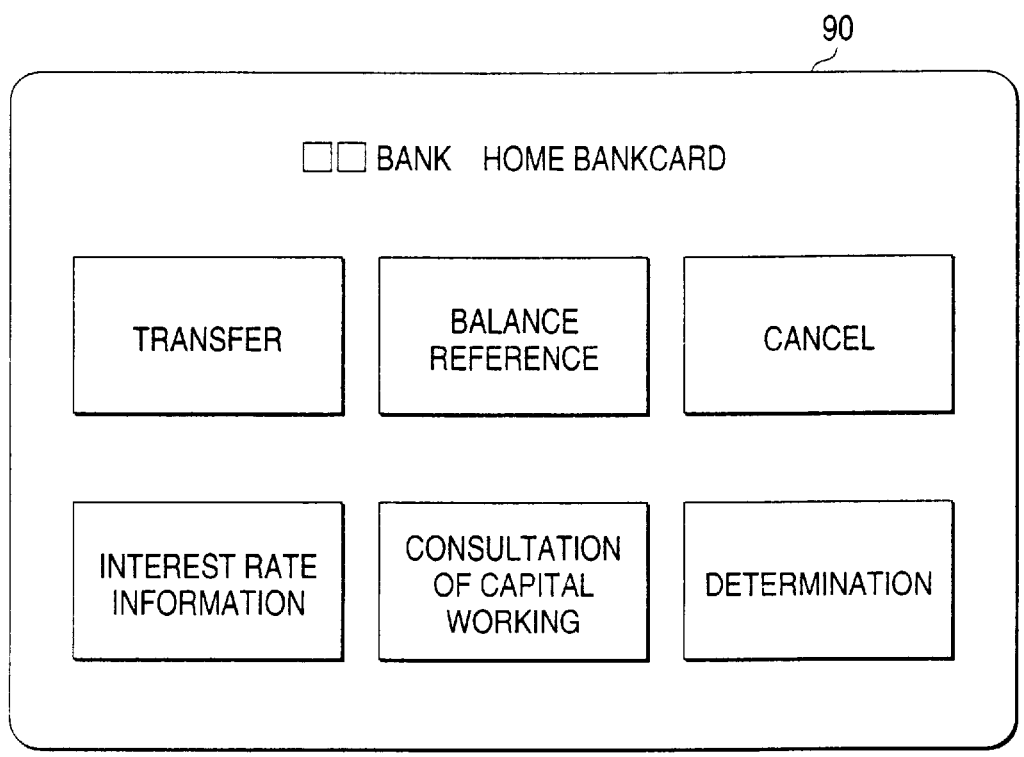
FIG. 17 is a diagram showing a home bankcard.

The card has various modes in addition to the above modes. For example, when a fitness club card 80 shown in FIG. 16 is set in the information terminal device 30 and the device is connected to the Internet, various kinds of data checked in the fitness club, a training program and the like can be referred, which is useful for health care. Further, when a home bankcard 90 shown in FIG. 17 is set in the information terminal device 30 and the device is connected to the Internet, account transfer, balance reference, confirmation of interest rate information, consultation of capital working, and the like can be performed, so that it is not necessary to go to the bank.

According to the invention, by mounting the card, the key assignment is automatically performed and a dedicated device having the function corresponding to the card is provided. Therefore, only by exchanging the card, one device can be applied to the various uses.

What is claimed is:

1. A tablet type key input device comprising:

an insertion inlet into which information memory medium having a plurality of marks displayed on a surface thereof is inserted;

a transparent tablet in which the marks of the information memory medium inserted into said insertion inlet are represented as a key operational portion;

a reading portion for reading a program recorded in said information memory medium;

a memory portion for storing the program read by said reading portion therein;

a control portion for assigning each of said plurality of marks represented on said tablet to a corresponding one of a plurality of specific keys according to said program, and a transmit-receive portion for transmitting a signal corresponding to the key according to the operation of the assigned key and receiving the predetermined information from an external portion; and a display portion for displaying the received information, wherein a layout of the plurality of keys represented in the table is the same as that of keys displayed on the display portion.

2. The tablet type key input device according to claim 1, wherein said information memory medium is an IC card.

3. The tablet type key input device comprising:

an insertion inlet into which information memory medium having a plurality of marks displayed on a surface thereof is inserted;

a transparent tablet in which the marks of the information memory medium inserted into said insertion inlet are represented as a key operational portion;

a reading portion for reading an identification code recorded in said information memory medium;

a memory portion in which a program for assigning each of said plurality of marks to a corresponding one of a plurality of specific keys is stored;

a control portion for reading a program according to the identification code read by said reading portion from said memory portion and performing key assignment in accordance with the program, and a transmit-receive portion for transmitting a signal corresponding to the key according to the operation of the assigned key and receiving the predetermined information from an external portion; and a display portion for displaying the received information, wherein a layout of the plurality of keys represented in the table is the same as that of keys displayed on the display portion.

4. A tablet type information terminal device comprising:

an insertion inlet into which information memory medium having a plurality of marks displayed on a surface thereof is inserted;

a transparent tablet in which the marks of the information memory medium inserted into said insertion inlet are represented as a key operational portion;

a reading portion for reading information recorded in said information memory medium;

a control portion for assigning each of said plurality of marks represented on said tablet to a corresponding one of a plurality of specific keys according to the information read by said reading portion;

a transmit-receive portion for transmitting a signal corresponding to the key according to the operation of the assigned key and receiving the predetermined information from an external portion; and a display portion for displaying the received information, wherein a layout of the plurality of keys represented in the table is the same as that of keys displayed on the display portion.

5. The tablet type information terminal device according to claim 4, wherein said information memory medium stores a specific URL address, the URL address being read by said reading portion, said device is connected to Internet through said transmit-receive portion, and contents in a home page corresponding to the URL address are displayed on said display portion.

6. The tablet type information terminal device according to claim 4, wherein the information memory medium on which key layout of a standard keyboard is represented is received, and the keys represented in the tablet are assigned to keys of the standard keyboard.

\* \* \* \* \*